Aug. 16, 1938.   G. E. GRINDROD   2,127,026
DISPERSING METHOD
Filed Oct. 9, 1936   2 Sheets-Sheet 2

Inventor
George E. Grindrod
By Wheeler, Wheeler & Wheeler
Attorneys

Patented Aug. 16, 1938

2,127,026

UNITED STATES PATENT OFFICE 2,127,026

DISPERSING METHOD

George E. Grindrod, Oconomowoc, Wis.

Application October 9, 1936, Serial No. 104,880

9 Claims. (Cl. 252—6)

My invention relates to improvements in methods for the dispersion and recombination of materials, including means for the production of emulsions, colloids, and chemical compounds.

The primary object of my invention is to provide means whereby materials can be more effectively and completely dispersed and the dispersion carried to a finer degree of sub-division than has heretofore been thought possible, and whereby the production of colloids may be facilitated, the production of new colloids and colloids having new characteristics made possible, and new fields opened for the dispersion and recombination of substances and elementary materials.

More particularly stated, my objects are to develop kinetic energy by expansion of an elastic fluid under constant entropy and utilize such energy to not only subject dispersible material to shearing, abrading and impactive contacts of the particles, but to also impart velocities to measured quantities of the material far beyond the velocities obtainable by means of homogenizers or mechanical agencies of any description, whereby particles of such material may be impacted to accomplish the degree of dispersion aforesaid, and whereby different materials may be dispersed in the presence of each other to increase their miscibility, produce new colloids, emulsions, or obtain increased activity in chemical reaction and combination.

I have discovered that it is possible, by an adiabatic expansion of steam under certain conditions, to impart to the material to be dispersed a velocity five or ten times as high as any velocity obtainable by mechanical means. The energy carried varies as the square of the velocity, and the dispersive effects obtainable are, to a considerable extent, entirely novel.

There are certain principles involved in colloidal reactions, heretofore unrecognized, but which have to do with the time lag in such reactions, the production of a condition in colloids analogous to the nascent state of certain elements, and the stabilization of such colloids. I have discovered that it is possible to utilize these principles to accomplish dispersions directly into products of colloidal form at speeds which avoid normal reactions, such, for example, as coagulations, and produce products having novel characteristics, some of which are hereinafter specifically mentioned. It is my object to provide a method and apparatus for utilizing these discoveries for the production and stabilization of colloids, and to expedite chemical reactions, to produce new substances and substances having novel characteristics, to reduce the expense of producing ordinary colloids, and to make such results attainable in general commercial practice.

This application is a continuation in part of my former application, Serial Number 592,053, filed February 10, 1932, for Dispersing methods and apparatus, my object being to include additional disclosures.

I find that the process of dispersion hereinafter described may be so controlled as to produce valuable results in sterilization and in deodorizing, particularly of materials cotaining fats and oils.

The extreme dispersive effects producible by high velocity steam jets applied under the conditions hereinafter specified have a practically parallel effect in destroying of bacterial cells, so that a fluid material subjected to the dispersive treatment hereinafter described is at the same time sterilized with a high degree of efficiency.

Food materials containing fats or oils may be effectively deodorized or purified by subjection to the dispersive effect of high velocity steam. The primary requirement for efficient deodorizing for materials containing fats and oils is that the fat or oil be dispersed to a high degree in order to facilitate removal of volatile flavors and odors. It has long been known that the spraying of a fatty material in the presence of steam has a distinct deodorizing effect upon the fat, even when the velocity of the spray or discharge is relatively low. It has heretofore been necessary to subject fatty emulsions, such as cream, to an extreme amount of steam distillation by way of discharge from a higher temperature into a vacuum, whereby the moderate velocity and simultaneous evaporation of water bring about deodorizing. I have found that the process for producing extreme dispersions by means of high velocity steam has the effect of deodorizing fatty materials without discharge to vacuum due to the fact that the fat globules are dispersed to such a high degree that the surfaces exposed become relatively much greater and the deodorizing is accomplished much more rapidly.

The advantages of this accelerated deodorizing over vacuum deodorizing as heretofore carried out are primarily simplicity of apparatus, elimination of large and expensive vacuum equipment, and to the accomplishment of sterilization, homogenizing, or dispersion and sterilization simultaneously and with the same apparatus.

In the drawings.

Like parts are identified by the same reference characters throughout the several views.

Figure 1:
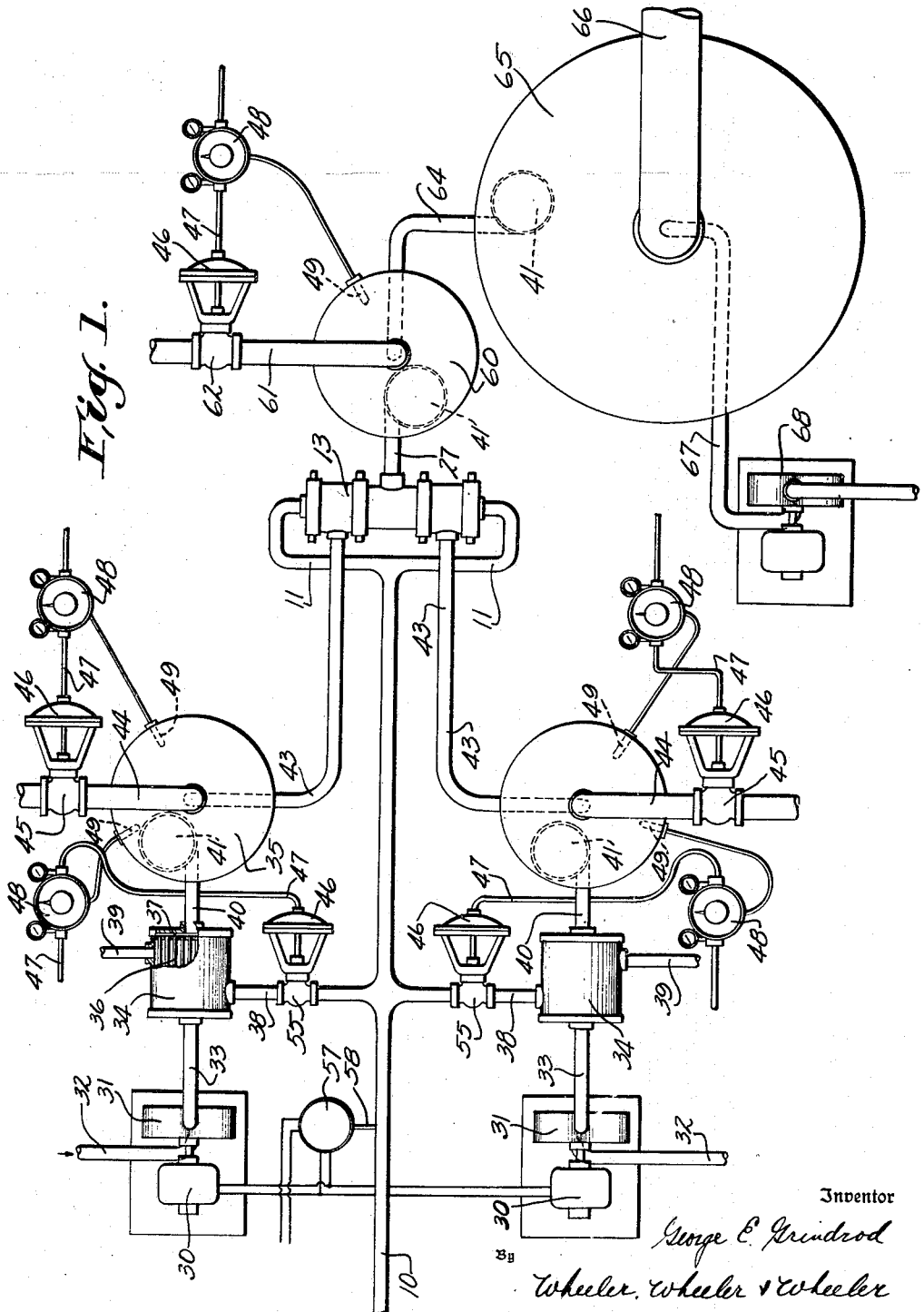
Figure 1 is a conventional view, in plan, illustrating my apparatus in its preferred form.

I have discovered that by adiabatically expanding steam or other elastic fluids in an expansion nozzle of certain continuously varying cross sectional area and then delivering it into a measured quantity of liquid or liquiform material of properly proportionate weight, the delivery of the liquid and of said fluid being continuous and both being at approximately the same temperature at the point of contact, the kinetic energy of the steam can be utilized to a maximum degree. The velocity of steam under such conditions may be calculated as follows:

$$V = 223.7 \times \sqrt{H_1 - H_2}$$

$H_1$ is the B. t. u. contained in the steam under the initial condition of pressure.

$H_2$ is the B. t. u. contained in the steam after adiabatic expansion at constant entropy, as determined from a Mollier diagram.

For example, for saturated steam at 200 lbs. gauge pressure, $H_1 = 1200$ B. t. u.

Expanded adiabatically to 10 lbs. gauge pressure, $H_2 = 1020$ B. t. u.

$V = 3000$ ft. per second.

Thus, 180 B. t. u. are converted into velocity, a totally different result from that resulting from simple expansion.

The term "adiabatic expansion" is used in its generally accepted sense and in recognition of the fact that during expansion in either a nozzle or a cylinder there may be a slight loss of heat by conduction through the wall to a lower external temperature, or a slight addition of heat if the external temperature is higher. In the structure illustrated in the drawings hereof such variation in temperature is negligible, substantially no heat being added or rejected, and the drop in temperature being directly proportional to the expansion in the nozzle, i. e., the variation in temperature is inversely proportional to variation in volume.

If the steam is allowed to change temperature by condensing while heating an incoming liquid, the first effect is to convert the 180 B. t. u. equivalent back into heat with consequent loss of velocity, since the velocity is dependent solely on the kinetic equivalent of the 180 B. t. u. and no velocity is acquired from any of the remaining 1020 B. t. u. In ordinary emulsifiers, none of the kinetic energy component has been so utilized, since the steam was mostly or entirely condensed.

I find that if liquid having the same temperature as the outgoing steam is continuously delivered into the path of steam having such velocity, the liquid delivery being in the proportion of about four parts by weight of liquid to one part by weight of steam, the kinetic energy remains effective as velocity energy and except for friction loss a resultant velocity of liquid and steam may be calculated as follows:

$$E = \tfrac{1}{2} M V^2$$

E = kinetic energy

M = total moving mass

V = velocity in ft. per second

Assuming that a unit weight of steam, 1 lb., is flowing per second, then its energy, $$E = \frac{V^2}{2}$$

If the moving mass is enlarged by addition of 4 lbs. per sec. of hot liquid, E remains constant, but V decreases as follows:

$$E = \frac{(4+1)}{2} V^2 = \frac{5 V^2}{2}$$

$$V^2 = \frac{E}{5} \text{ and } V = \sqrt{\frac{2E}{5}}$$

Since 2E remains constant, the resultant velocity =

$$\sqrt{\frac{3000}{5}} = 1340 \text{ ft. per sec.}$$

Actually, friction losses account for about 15% of the energy so that the resultant velocity is slightly less. But it is evident that velocities are obtainable which are far above those attainable mechanically, or by means of condensing jets.

The outgoing steam temperature and pressure, which in the above example was assumed to be 240 degrees F. and 10 lbs. gauge, may be controlled at any desired point above or below the atmosphere by setting a suitable relief valve. The temperature selected depends entirely on the chemical changes to be produced and the fluidity of the materials.

My invention contemplates the utilization of the velocities thus attainable to obtain shearing, abrading and impacting effects suitable to accomplish dispersion for various purposes, including among others the following:

1. Creating emulsions and homogenizing.
2. Dispersing liquifiable or entrained dispersible solids to the colloidal state.
3. Forcing the adsorption of dissolved colloids upon solid particles or globules.
4. Redispersing coagulable substances into new colloidal solutions.
5. Disintegrating suspended solids, with simultaneous redispersion.
6. Instantaneous production of chemical reactions between colloids, or substances capable of simultaneous dispersion.
7. Production of chemical reactions in or between substances ordinarily coagulable, with end product amorphous or in colloidal solution.
8. Production of amorphous or colloidal precipitates where crystalline or granular precipitates would ordinarily be produced.
9. Destruction presumably by disruption of organic cells.
10. Deodorizing of fatty and oil emulsions by means of dispersion or subdivision of the particles to a high degree in the presence of moving steam.

My invention will now be described with reference to the treatment of liquiform materials, the term "liquiform" being intended to include all fluids, whether liquid or gaseous, and solids entrained therein or capable of being conveyed or fed in measured quantities for the purposes of dispersion in general correspondence to the methods employed for conveying and for dispersing liquids.

In the following detailed description of the improved method it will be assumed that steam is to be utilized as the dispersing agent. The desired initial pressure of the steam will be determined, at least in many instances, by the degree of dispersion desired. Steam at the selected pressure is passed through an expanding nozzle (or for large scale production through a multiple series of expanding nozzles). To develop the kinetic energy of the steam, each nozzle will have a continuously varying cross sectional area, preferably a conical enlargement, and each steam nozzle will preferably be made sufficiently small to allow substantially all of the steam to be available for imparting its energy to the liquid in the immediate vicinity of the nozzle outlet. On the other hand, the size of each steam nozzle should be such as to avoid excessive friction loss. A nozzle having an inlet of approximately .05 inch in diameter to .10 inch in diameter will be found suitable as representing a nozzle size which avoids the two extremes above indicated, and utilizes the energy of the steam to good advantage for the purposes herein stated.

The expansion nozzles, and also the passages within which the desired velocity of the liquid is to be developed, will vary in size at the inlet, in progressive cross sectional area and in length, in accordance with the requirements for each installation or for the working conditions imposed by the character of the material and the result sought. The dimensions will be determined in each instance in accordance with the definite mathematical laws governing the flow of steam. In general the expansion nozzle will be similar in form to those employed in high speed turbines.

Steam passing through these nozzles is delivered into a flowing stream of liquid or a liquid having entrained solids. For many purposes the total weight of the liquid may be equal to approximately four times the weight of the steam. The particles of material will be initially impacted, sheared, or abraded by the particles of steam, and by confining the material in a passage, it may be driven by the steam through such passage at the maximum speed that can be imparted to it under the stated conditions, viz,—at a velocity equal to about one half that of the steam at the steam nozzle outlet.

By delivering this rapidly moving material against a relatively stationary body of unyielding material, such as a fixed impact receiving metal plate (Figure 5), or by delivering the material against particles of other material driven in a different or opposing direction (Figure 2), impacts of extreme violence will occur and the desired degree of dispersion will be accomplished.

It will be understood that the dispersed material should immediately be removed or drained away from the space in which the impacts occur. The vapor should also be withdrawn or allowed to escape to the atmosphere at a rate permitting the temperature and pressure to be kept equal to that of the entering liquid.

Figure 2:
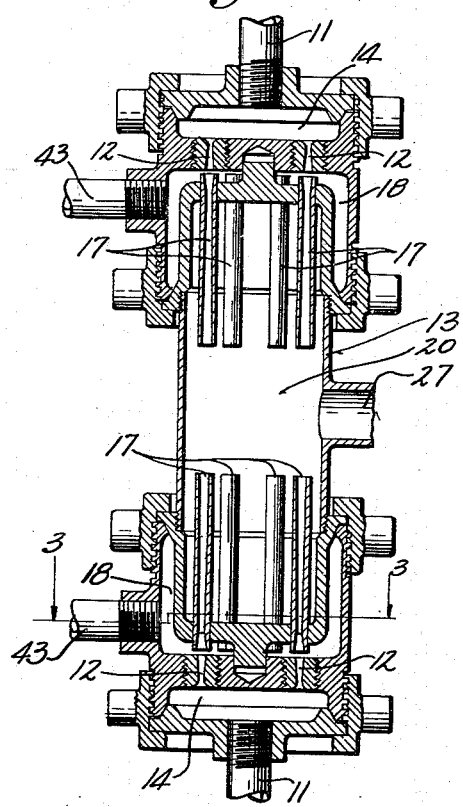
Figure 2 is a longitudinal sectional view of the dispersing chamber.
Figure 3:
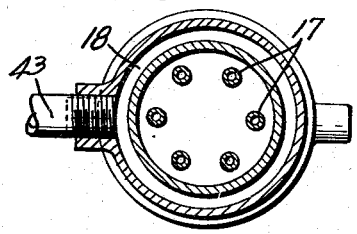
Figure 3 is a cross section drawn on line 3—3 of Figure 2.
Figure 5:
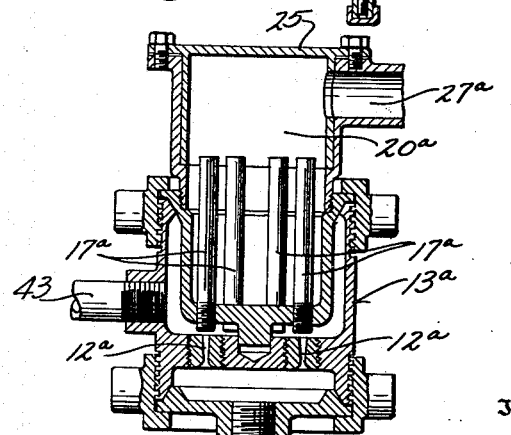
Figure 5 is a sectional view illustrating a modified form of the dispersing chamber shown in Figure 2.

In carrying out the above described method I may employ the apparatus illustrated in the accompanying drawings in which the dispersion chamber is illustrated in Figures 2 and 3 and in modified form in Fig. 5. This dispersion chamber will first be described, after which its relation to the associated apparatus conventionally illustrated in Figure 1 will be explained.

In Figure 1 a steam supply pipe 10 has branch connections 11 for delivery of steam (elastic fluid) to sets of expansion nozzles 12 (Figures 2 and 3) located in the respective end portions of a dispersing chamber 13, the steam being received in each end cavity 14 for distribution to the associated nozzles.

At each end of the dispersing chamber 13 shown in Figure 2 the steam is adiabatically expanded in the nozzles 12 and delivered into axially aligned nozzles 17, which also receive the material to be dispersed from a cavity 18. Such material is being continuously supplied to the cavity 18 as hereinafter explained.

The nozzles 17 are spaced from the nozzles 12 sufficiently to allow material from the cavity 18 to be entrained and carried by the steam through the nozzles 17 with slight aspiration and no condensation, the temperature being equalized. The nozzles 17 are preferably conically enlarged in the direction of their outlets to reduce loss by friction to a minimum.

The material is driven through the nozzles 17 into a receiving cavity 20, within which it is impacted against material coming from the axially aligned nozzles 17 of the set at the opposite end of the dispersing chamber 13. The material thus delivered through the nozzles 17 of the respective sets will be simultaneously dispersed by impacts of the particles upon each other at velocities determined by the combined velocities of the opposing jets. The dispersed material is permitted to pass continuously through an outlet 27, its flow being regulated, as hereinafter explained, for the purpose of regulating the pressure and temperature in the receiving cavity 20.

In the slightly modified structure illustrated in Figure 5, the dispersing chamber 13a has a set of nozzles 12a and 17a at one end thereof which correspond in form and arrangement with the nozzles 12 and associated nozzles 17 in Figure 2. But in the structure shown in Figure 5 the nozzles 17a deliver the material against a fixed impacting plate 25, which may constitute the opposing end wall of the receiving cavity 20a, said wall being located on the opposite side of the passage 27a from the occupied by the nozzles.

In Figure 1 it will be observed that the material may be continuously prepared for dispersion and delivery to the cavities 18 of the dispersing chamber, the agencies illustrated in Figure 1 being adapted for handling liquiform material. They comprise a motor 30, pump 31, heater 34, and a heat regulating chamber 35 which may also serve as a separator for the release of air and surplus vapor.

The motor 30 is indicated as an electric motor, directly connected with the pump 31. The latter receives the material from a supply duct 32 and delivers it through the duct 33 to a heater 34, preferably a tubular heater of that type in which pipes or tubes 36 connect end cavities 37 and in which the space between the tubes 36 is continuously supplied with a circulating heating fluid. The heating fluid may be supplied from the pipe 10 through the duct 38, and allowed to escape through an outlet or to a return duct 39.

Figure 4:
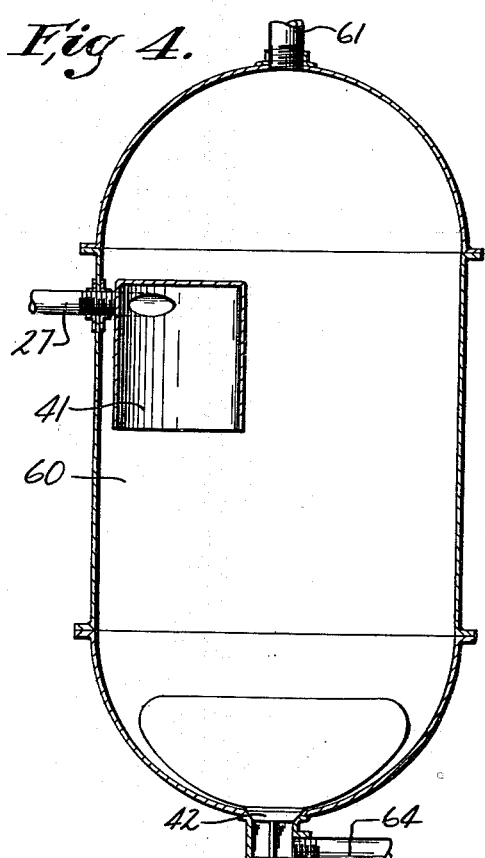
Figure 4 is a vertical sectional view of the separating chamber.

The material passes from the heater 34 through a duct 40 into the regulating chamber 35, splashing being prevented by a tangentially connected inverted cup 41 of ordinary type, and from the bottom portion of this heat regulating chamber 35 the material passes the float controlled valve 42 (Figure 4) to the duct 43 which conveys it to the associated cavity 18 in the dispersing chamber 13.

The similar cavity 18 at the other end of the dispersing chamber will preferably be independently supplied through connections similar to those above described, thus adapting the apparatus for simultaneous delivery of like material to be merely dispersed in the dispersing chamber of different materials to be delivered to the respective ends of the dispersing chamber for dispersion and recombination within the cavity 20.

To obtain accurate temperature and pressure control the heat regulating chamber 35 has its upper portion provided with an outlet duct 44 for the escape of air and vapor, the flow of which is controlled by a temperature regulated valve 45. This valve may be automatically adjusted by a diaphragm in the diaphragm chamber 46 on an air line 47 provided with a pressure regulator 48 controlled by a control bulb 49 exposed to the temperature in the chamber 35. Like equipment may be employed to adjust a valve 55 to regulate the supply of heating fluid delivered to the chamber 34 through the pipe 36. If the supply of steam in the pipe 10 should fail, the circuits through motors 30 will be automatically interrupted by a mercoid switch 57 connected by a duct 58 with the pipe 10.

The material dispersed in the receiving cavity 20 of the dispersing chamber 13 is conveyed by the duct 27 to a vapor separating chamber 60 similar in construction to the chamber 35. The excess vapor passes through the outlet duct 61, its flow being regulated by a valve 62 in the same manner as above described with reference to the valve 45 associated with the separating chamber 35. The separating chamber 60 is provided with a float controlled bottom valve 42 like that shown in Figure 4, whereby the material is allowed to pass through a duct 64 to a vacuum chamber 65 of ordinary type, equipped with a suction duct 66 at its upper end and a draw-off pipe 67 at its lower end, which may be connected with a motor driven pump 68. The general organization of the vacuum chamber 65 may be assumed to be similar to the chamber shown in Figure 4, with the float controlled valve 42 at the bottom outlet.

In the use of the described apparatus, assuming that sufficient water will be present in the material to absorb the heat, it will be evident that the disruption or the dispersion of the material will continue until the energy represented by the heat generated by such disruption equals the kinetic energy carried, since there is no disruption way except by friction losses in which this energy can be dissipated. With a proportion of liquiform material to steam at approximately 4 to 1, about 80% of the kinetic energy can be transferred to such material without change of temperature. Assuming an initial steam pressure of 200 lbs. per square inch and a reaction temperature of 240° F. and 10 lbs. gauge, the velocity of the liquiform material entering the receiving chamber will be approximately equivalent to the obtainable by a hydrostatic head of 28,000 feet, or a pressure of 11,500 lbs. per square inch. So far as I am aware, this is a working condition heretofore entirely unknown.

The selection of material for each portion of the apparatus is important, the use of common metals being in general entirely unsuitable. The entire apparatus should be constructed of material which is inactive or inert when brought in contact with the liquids to be treated. It should also be immune to steam corrosion and must be extremely hard and strong. Nozzles made of brass, bronze or iron have no practical durability under the extreme working conditions imposed, and particles abraded therefrom would in many instances seriously damage the product. The interior of the receiving chamber is subjected to great abrasion, and any tendency toward chemical corrosion is so accentuated under the high velocities attained as to bring about the quick corrosion and disintegration of any susceptible metal.

For liquids which are not corrosive, nitrided steel is satisfactory, this being substantially the hardest metal known. It is particularly suitable for the nozzles and for the receiving chamber in cases where solid particles are carried in the liquid.

Apparatus employed for liquids which are acid or chemically corrosive should be formed of extremely hard nickel-chromium alloys, since few chemicals other than hydrochloric acid will cause their corrosion or disintegration. For many liquids the cobalt-tungsten alloy, Stellite, will be found suitable.

In the treatment of organic substances, oxidation catalysts must be carefully avoided, since all chemical reactions are accelerated in the apparatus far beyond their normal rate.

The pumps should also be made of hard corrosion resistant metal in order to avoid wear and maintain the desired close limits of tolerance, whereby such pumps may operate continuously as metering pumps, the maintenance of any predetermined velocity being dependent, in part, upon the continued delivery of the required proportionate weight of material.

The pumps will preferably be driven by a synchronous motor as indicated at 27 so that there will be no slippage in motor or power transmitting mechanism. In this respect, the apparatus differs from those involving the use of a gravity or equivalent pressure head with or without a valve to regulate delivery.

By metering the supply, surging may be avoided, such as would otherwise overload the nozzle in a manner to start condensation. When condensation commences, the suction increases and causes a still more rapid flow with additional lowering of temperature. Much of the otherwise available kinetic energy will then be lost, thus making impossible either the attainment of the required velocity or the maintenance of a predetermined velocity.

But since it is an object of my process to impart maximum kinetic energy to liquids or suspensions, or to impart a desired degree of kinetic energy with minimum loss under the conditions of controlled temperature, and since the kinetic energy carried by matter in motion varies as the square of the velocity,—condensation of the steam or other vapor prior to delivery of the material into the dispersing chamber should be avoided. With the incoming liquid in thermal equilibrium with the outgoing, even a mere steam injector will not function as such, for it begins to exert its suction upon the liquid only when the liquid is colder than the steam. Steam emulsifiers, as heretofore made, utilized the suction of the steam jets to draw in and feed the liquid, and such a condition does not develop or retain the energy of motion, which is the useful component of the total energy of steam flow.

Nearly all of the useful working temperatures are either higher or lower than the boiling point and, therefore, for the reasons above explained, there should be positive mechanical flow control. After the incoming material has once been metered, it is then possible to release air, surplus vapor, and regulate the temperature precisely as is done in the chamber 35 as an aid in the maintenance of the desired continuous balance and maintenance of the exact pressure and temperature requirements.

Steam pressures employed in the various adaptations of this process vary over a large range in accordance with the purposes to be accomplished and the materials being treated. It is possible to obtain enormous velocities of steam with relatively low initial pressures, provided the discharge of the nozzles is directly into a still lower pressure; that is, a partial vacuum. It is possible to control the temperature of the impinging steam within practically any range desired from about 40° F. to the maximum temperatures attainable by steam boilers. If materials being treated require treatment in a low range of temperature, that temperature is maintained by proper control of the absolute temperature at the point of discharge of the steam. The absolute pressure of the steam before its expansion in a nozzle, and the temperature into which it is discharged after expansion determine the velocity which it will attain. The following examples of practical working ranges of initial pressures and discharge pressures or temperatures will aid in understanding the selection of working pressure and temperature ranges. For accomplishing sterilization and dispersion in a food product it is generally necessary that the expanded pressure of the steam jet be such as to maintain a relatively high temperature at the point of expansion; for example, 260° to 270°.

The initial pressure of the steam need not be excessive for accomplishing dispersion of most food materials. A gauge pressure of 50 pounds, for example, is sufficient in many cases to supply the velocity and kinetic energy required. Higher gauge pressures may be used for greater dispersive effect, as wanted.

For producing chemical precipitates of organic compounds which are sensitive to heat, it may be necessary to work with expansion temperatures well below the normal boiling point of water, supplying at the same time such initial pressure as may be required to accomplish the dispersion. Where the discharge is into a partial vacuum for the purpose of maintaining a lower discharge temperature, very high velocities may be attained from ordinary boiler pressure, as, for example, 100 pounds per square inch. For accomplishing sterilization and deodorizing of such materials as cream, the discharge temperature of the expanded jets may be at approximately the normal boiling point of water, thus avoiding subjecting the fatty material to a high temperature and at the same time avoiding the necessity for means of maintaining a vacuum at the point of discharge.

For deodorizing of most edible fats and oils in the form of emulsions it is not necessary to use initial pressures above the range of ordinary boiler pressure, or 50 pounds to 100 pounds gauge pressure. Extreme dispersion of fluid fats and oils is readily accomplished by moderate pressures when the steam is expanded in properly constructed nozzles.

I have found that in accomplishing sterilization and in accomplishing the completion of some chemical reactions it is advantageous to prolong the time interval of exposure to a selected temperature beyond the very brief period of exposure in the nozzles and at the point of impact. If the atomized liquid and expanded steam are allowed to escape immediately from the point of impact, the high velocity necessary makes the time of exposure to the selected temperature immeasurably brief. I have found that the time interval of temperature maintenance of a selected temperature may be controlled by discharging the steam and atomized liquids into a baffled tube so that instead of leaving the reaction chamber instantaneously, the liquids may be maintained at the temperature of reaction for a selected number of seconds thereafter, which in many cases is advantageous in completing chemical reactions and in completing sterilization. The addition of a baffle tube of selected length is an advantageous improvement to the dispersion apparatus as a means of controlling the time interval of exposure to temperature.

When the steam is applied at the described velocities to substances in solution which are ordinarily coagulable or precipitable by heat, new results are obtained. Albuminous solutions are typical of this class.

During the short interval required for passage of a particle through the jets, the molecules of albuminous substances are apparently split or broken up and they or their components exist in a state analogous to the nascent state of an element.

When an albuminous solution is treated by the described method, it does not coagulate due to the heat, even though it be heated to at least 100° F. above its coagulation point. It remains in colloidal solution, since the time interval required for a molecule of albumin to go through the chemical change of coagulation is less than the time interval required for its passage through the jets.

If an oil or other non-miscible substance is impacted against opposing jet streams carrying the water solution of albuminous colloids, the albumin will not coagulate but will combine with the oil substantially at the points of impact.

Any excess of albumin beyond that which can be adsorbed, remains in colloidal solution instead of coagulating as it does when treated by a simple steam jet. Adsorption may thus be produced without the usual clotting and coagulation around the fat globules, the adsorbed material being not only different in kind but considerably increased in quantity.

If two different colloids capable of chemical reaction with each other to produce a precipitate are respectively fed in solution through different nozzles and the equilibrium temperature maintained high enough to produce reaction, they will react instantaneously, but instead of precipitating, the new substance will remain as a true colloidal solution of a substance ordinarily regarded as insoluble.

Also, if a colloid and a precipitant are thus combined by impacting them at the described velocities in the presence of each other, the chemical reaction takes place instantly but no precipitate forms. Thus, casein in colloidal suspension or solution, a new form of casein heretofore unknown, and one which would ordinarily be considered to be in contradiction of natural laws.

It will be understood that in the use of the structure shown in Figure 5 different materials may be simultaneously impacted and dispersed in the presence of each other by using some of the nozzles for one purpose and some for another. The expression, "opposing jets", as herein used is, therefore, to be understood as including any means whereby different materials may be impacted in such a manner as to commingle their dispersed particles.

If two precipitant solutions of non-colloidal nature are fed through different jet streams, one of the solutions carrying a small amount of some protective colloid, in addition to the solute, an unusual result is obtained. The chemical reaction is produced at the point of impact but due to the velocity, the new compound has no opportunity to change to the form of a precipitate. To form a precipitate, either crystalline or gelatinous, a certain time interval is required for the molecules to move into combination. On account of the instantaneous reaction, they are dispersed as formed. They would subsequently undergo the usual transformation into a visible precipitate in the absence of a protective colloid. But, in the presence of a small proportion of a protective colloid, adsorption takes place before the new compound exceeds colloidal size in its attempt to agglutinate.

Thus, many inorganic or crystalline substances may be produced in colloidal solution, including paint pigments and similar materials heretofore made by simple chemical precipitation and mechanical grinding.

I am aware of the fact that by using mechanical agitation it is possible in some instances to bring about a retention in colloidal solution of substances that would otherwise precipitate. But such results have heretofore been limited to a very few compounds in which rate of agglutination is slow, and even as to those compounds such methods are not always available for commercial purposes, partly because of the expense, the difficulty of obtaining uniform results, and also because excessive amounts of protective colloid are ordinarily required. For example, silver chloride may be retained as a colloidal solution by mixing dilute silver nitrate and a soluble chloride in an albumin solution.

This reaction has been regarded as a scientific curiosity, and has no practical use; but, by the method I have described, this same basic principle is applicable not only to the production of a colloidal silver chloride but of many other useful compounds, and very small amounts of the protective colloid are required.

The method which I have described is applicable to production of colloids of all kinds, whose rate of agglutination does not exceed a certain limit imposed by the time required for dispersion and for such protective colloidal adsorption as may be required to forestall agglutination. The chemical reaction must be producible in the presence of steam or equivalent vapor or other elastic fluid, and within the working range of temperature which is practicable. Practically all precipitant solutions which have heretofore been reacted in the cold or at steam temperatures, are adaptable to the described process. The practical range of reaction temperatures for steam is readily variable from about 70 degrees F. to about 300 degrees F. Higher temperatures could be utilized but at present are not required for any commercial use.

In each operation the reaction temperature is selected with reference to the requirement for the desired treatment of the material in question and the purpose of the treatment.

For example, if it is desired to emulsify an oil into a liquid, the temperature must be above the melting point of the oil and beneath that at which the protective colloid will be damaged. If this temperature is less than the boiling point, then the discharge must be connected to a vacuum receiver. Vacuum receivers will preferably be used when treating food products. The degree of vacuum in the reaction chamber may, of course, be controlled by the pressure control valve between the reaction chamber and the vacuum receiver.

I claim:

1. A method of dispersion consisting in adiabatically expanding a jet of elastic fluid at substantially constant entropy to develop its kinetic energy, transferring the available portion of such energy to a stream of a mixture of dispersible material and an emulsifying medium having, at the point of contact therewith substantially the temperature of the elastic fluid and of predetermined weight proportions, whereby to impel the same at a high velocity, and then subjecting the material to impacts while under the acquired momentum.

2. A method of dispersion consisting in adiabatically expanding a jet of elastic fluid at substantially constant entropy to develop its kinetic energy, transferring an available portion of such energy to a stream of a mixture of dispersible material and an emulsifying medium of substantially the temperature of the elastic fluid at the point of energy transfer and of predetermined weight proportions, impacting said material while under its acquired momentum to disperse the same and reconvert its kinetic energy into heat, and simultaneously withdrawing heat units from the dispersed material to maintain a constant temperature.

3. A method of dispersion and recombination consisting in adiabatically expanding jets of elastic fluid at substantially constant entropy to develop the kinetic energy of said jets, transferring an available portion of the kinetic energy of the respective jets to streams of a mixture of dispersible material and an emulsifying medium of substantially the temperature of the elastic fluid at the point of such transfer and of predetermined weight proportions, whereby to impel said materials into impactive contacts at predetermined velocities, to disperse the same in the presence of each other.

4. A method of dispersion and recombination consisting in adiabatically expanding jets of elastic fluid at substantially constant entropy to develop the kinetic energy of said jets, transferring an available portion of the kinetic energy of the respective jets to impel streams of a mixture of dispersible material and an emulsifying medium of substantially the temperature of the impelling jets at the point of their contact with the material and of predetermined weight proportions, impacting said materials while under the acquired momentum to disperse the same in the presence of each other and continuously withdrawing the dispersed material and elastic fluid to regulate the temperature and degree of dispersion at the points of impact.

5. That step in a method of dispersion which consists in adiabatically expanding a jet of steam under constant entropy, continuously feeding into the path thereof a predetermined proportion of a mixture of dispersible material and an emulsifying medium having substantially the same temperature at the point of jet contact, projecting said material in jet form and subjecting it to motion arresting impacts.

6. That step in a method of dispersion consisting in continuously expanding a jet of elastic fluid without material loss of energy and delivering it into a jet of material consisting of a mixture of dispersible material and an emulsifying agent having substantially the same temperature whereby condensation is avoided and maximum utilization of the kinetic energy of the steam made possible.

7. A method of sterilizing liquiform material, consisting in adiabatically expanding a jet of elastic fluid at substantially constant entropy within a range of sterilizing temperature to develop its kinetic energy, imparting an equivalent temperature to a predetermined weight proportion of liquiform material to be sterilized, then transferring an available portion of said kinetic energy to said material to impel the same at velocities above those obtainable by mechanical means, and then subjecting the material to impacts while under the acquired temperature and momentum to obtain a degree of dispersion incompatible with continuance of life.

8. A method of deodorizing liquiform material, consisting in adiabatically expanding a jet of steam at substantially constant entropy, imparting to a liquiform material to be deodorized a temperature substantially equal to that of the steam so expanded, transferring an available portion of the energy of the steam to such liquiform material to impel the same at high velocity and subjecting such material to impacts while at the acquired temperature and under the acquired momentum.

9. A method of simultaneously and inexpensively dispersing, sterilizing and deodorizing liquiform material consisting in adiabatically expanding a jet of steam at constant entropy within a range of sterilizing temperature to develop kinetic energy, imparting to a predetermined weight proportion of liquiform material a temperature substantially equal to that of the expanded steam prior to contact with the steam, transferring a sufficient portion of the available energy of the steam to said material to impart thereto a velocity in excess of that obtainable by mechanical means and then subjecting said material to dispersing impacts and abrasion to develop a degree of dispersion productive of substantially instant dispersion, sterilization, and release of odorous gases.

GEORGE E. GRINDROD.

Certificate of Correction

Patent No. 2,127,026. August 16, 1938.

GEORGE E. GRINDROD

It is hereby certified that error appears in the printed specification of the above numbered patent requiring correction as follows: Page 2, second column, line 20, for the formula "$V^2 = \frac{E}{5}$ and $V = \sqrt{\frac{2E}{5}}$" read $V^2 = \frac{2E}{5}$ and $V = \sqrt{\frac{2E}{5}}$;

and that the said Letters Patent should be read with this correction therein that the same may conform to the record of the case in the Patent Office.

Signed and sealed this 1st day of November, A. D. 1938.

Henry Van Arsdale

*Acting Commissioner of Patents.*

[SEAL]